United States Patent [19]

Hughes et al.

[11] Patent Number: 4,705,036

[45] Date of Patent: Nov. 10, 1987

[54] HYGIENIC ATTACHMENTS FOR THERAPY LASERS

[75] Inventors: John L. Hughes; Frank E. Irons, both of Canberra; George Kwiatkowski, Isabella Plains, all of Australia

[73] Assignee: Hughes Technology Pty Ltd., Fyshwick, Australia

[21] Appl. No.: 805,881

[22] Filed: Dec. 6, 1985

[30] Foreign Application Priority Data

Dec. 6, 1984 [AU] Australia .............. PG8453

[51] Int. Cl.⁴ .............................................. A61B 17/36
[52] U.S. Cl. .................................................. 128/303.1
[58] Field of Search ............ 128/4, 6, 303.1, 395–398, 128/734, 735; D9/453; 215/224, 332, 340, DIG. 3

[56] References Cited

U.S. PATENT DOCUMENTS

| 2,186,143 | 1/1940 | Neugass ...................... 128/397 |
| 3,865,113 | 2/1975 | Sharon et al. ................ 128/395 |
| 4,016,870 | 4/1977 | Lock ............................. 128/735 |
| 4,071,156 | 1/1978 | Lowe ............................ 215/224 |
| 4,076,018 | 2/1978 | Heckele ........................ 128/6 |
| 4,215,678 | 8/1980 | Heine et al. .................. 128/6 |
| 4,224,949 | 9/1980 | Scott et al. ................... 128/734 |
| 4,526,170 | 7/1985 | Tanner .......................... 128/398 |
| 4,551,129 | 11/1985 | Coleman et al. ............. 128/303.1 |
| 4,559,942 | 12/1985 | Eisenberg ..................... 128/303.1 |
| 4,608,980 | 9/1986 | Aihara .......................... 128/303.1 |

FOREIGN PATENT DOCUMENTS

| 2479485 | 10/1981 | France .......................... 128/303.1 |
| 206442 | 11/1923 | United Kingdom .......... 128/396 |
| 2033649 | 5/1980 | United Kingdom .......... 128/303.1 |
| 1118374 | 10/1984 | U.S.S.R. ....................... 128/395 |

OTHER PUBLICATIONS

"The Laser Photocoagulating Dielectric Waveguide Scalpel", Doty et al., IEEE 1981.

Primary Examiner—Kyle L. Howell
Assistant Examiner—Max F. Hindenburg
Attorney, Agent, or Firm—Balogh, Osann, Kramer, Dvorak, Genova & Traub

[57] ABSTRACT

This invention consists of a range of easily attachable, disposable and sterilizable caps which can be fitted onto the output end of laser therapy heads to prevent the spread of transmissible diseases during laser therapy treatments of humans and animals over a range of laser wavelengths at power levels across the electro-magnetic spectrum while maintaining laser beam intensities of less than one milliwatt per circular area of 7 mm diameter.

7 Claims, 8 Drawing Figures

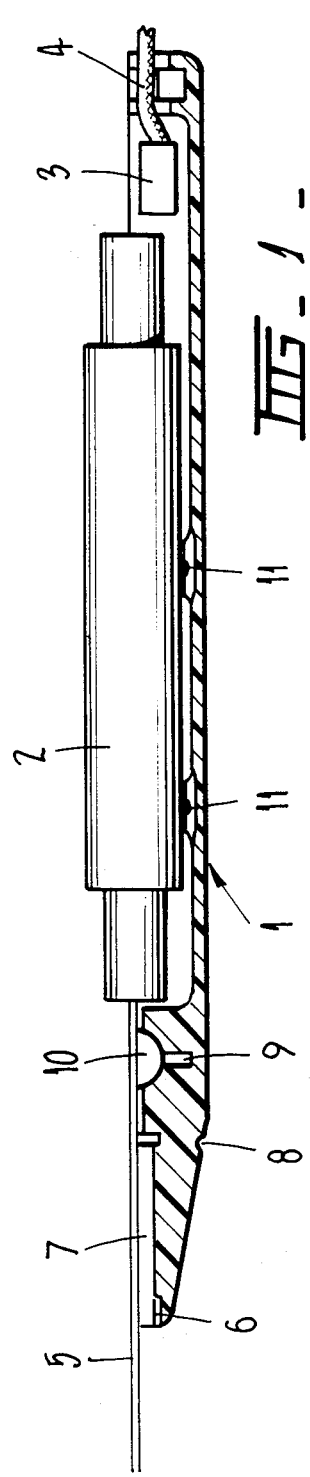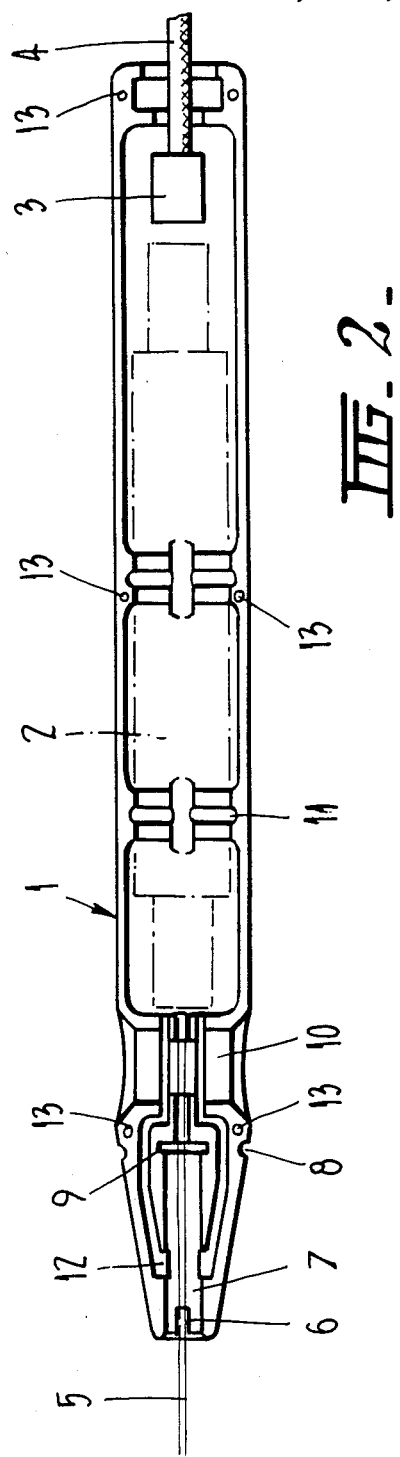

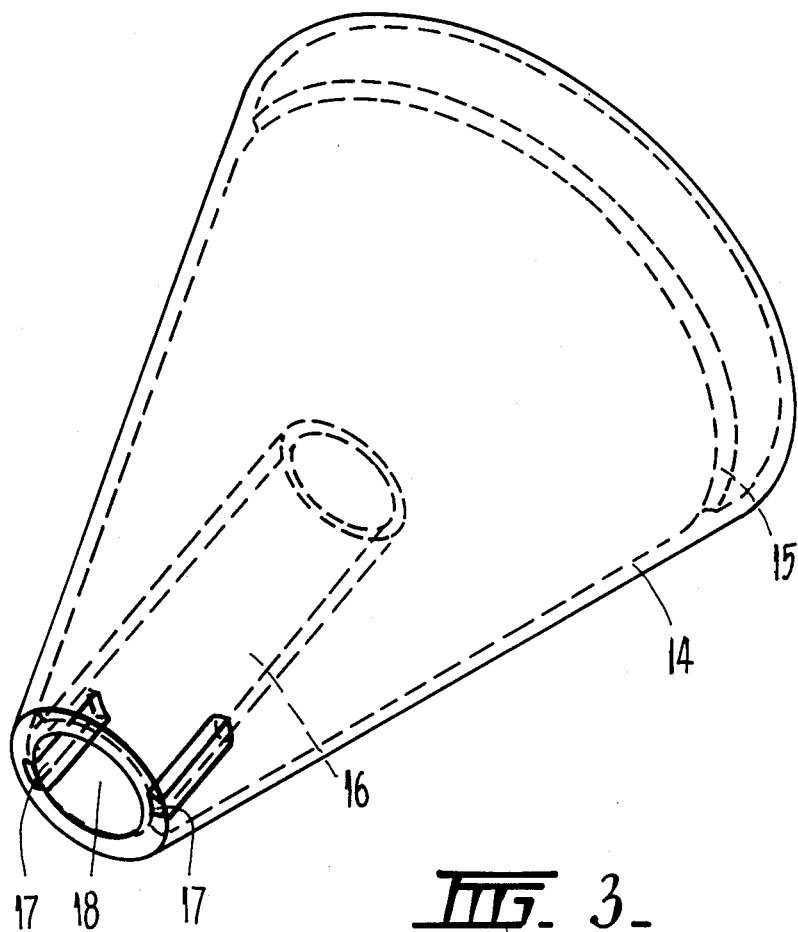

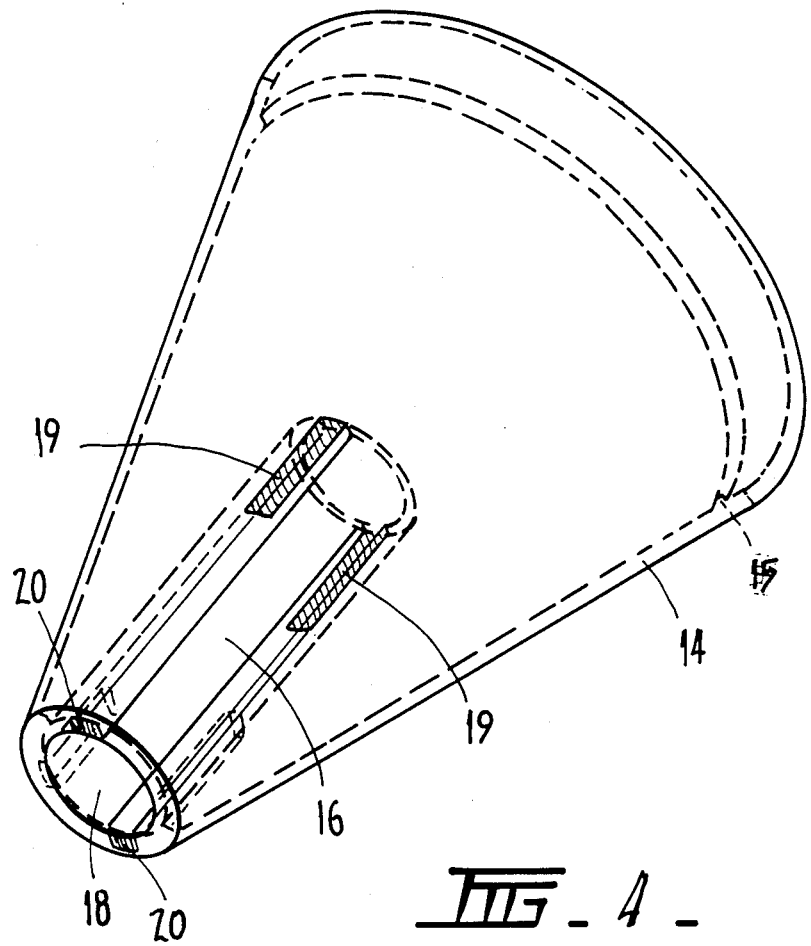
FIG_4_

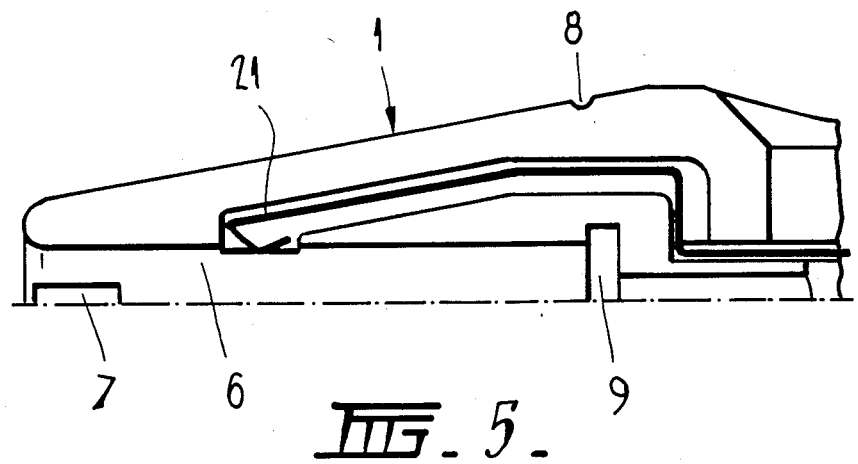
FIG_5.
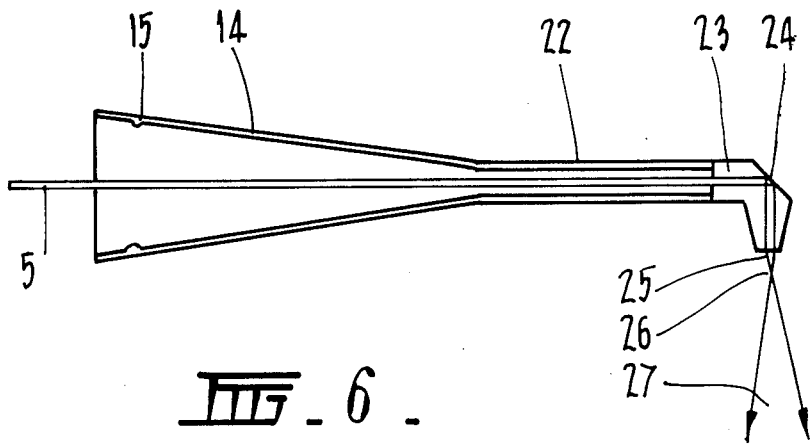
FIG_6.

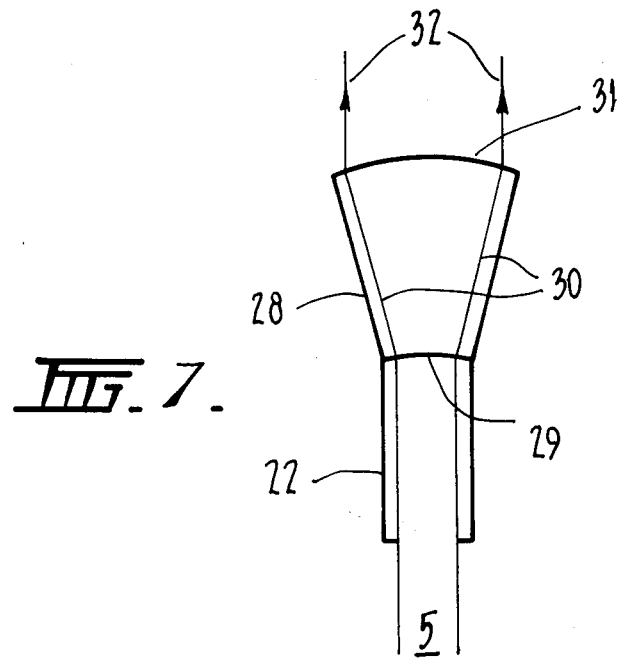
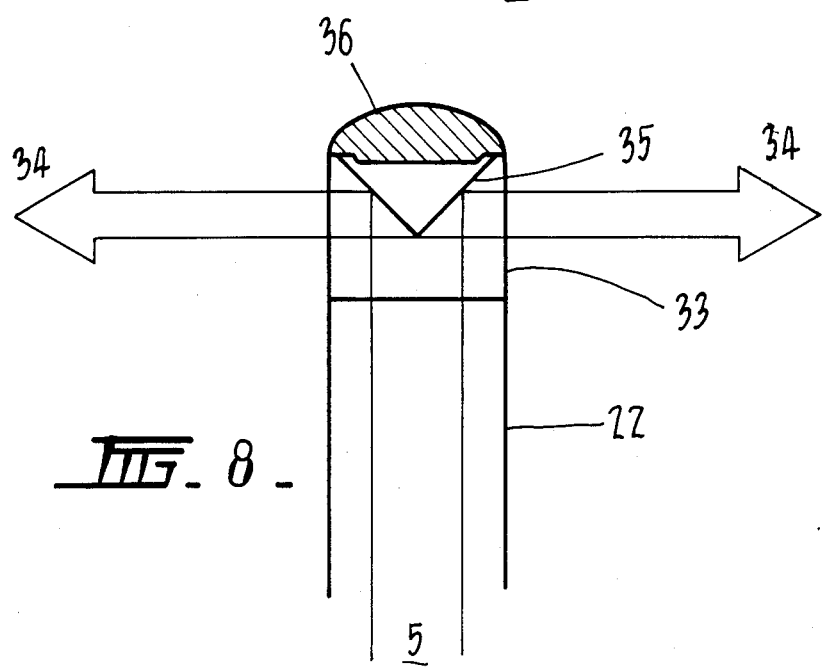

HYGIENIC ATTACHMENTS FOR THERAPY LASERS

This invention relates to a system for ensuring hygienic contact between a laser therapy unit, the therapist administrating the laser beam treatment and the patient receiving said treatment, comprising of detachable end caps which can be securely clipped onto the laser beam output tip of a therapy laser so as to prevent said laser output tip itself coming into contact with patients' bodies. If transmissible diseases such as acquired immune deficiency syndrome (AIDS) are picked up by said disposable caps, then in the case where such caps are of stainless steel construction, for example, they can be sterilized prior to further use, or to provide complete protection for both therapists and subsequent patients the caps can be of plastic construction and simply disposed of after being used on a patient.

SUMMARY OF THE PRIOR ART

Prior art laser therapy units are of two kinds, those with direct beam outputs and those whose outputs are delivered to the patient via a flexible optical fibre bundle. A fundamental problem with prior art laser therapy units is the fact that the output heads which are held by the therapists and come into frequent contact with the patients, particularly during internal body therapy, are difficult to sterilize. In the case of the direct beam laser therapy unit head, the whole head would have to be sealed to prevent the high voltage laser tube coming into contact with water. Similarly, the immersion of a fibre optical cable head would also require total head sealing to ensure full sterilizing action. Such prior art laser therapy units are low cost devices operating under CLASS II international safety regulation with maximum output of one milliwatt continuous beam power. To provide a sealed, sterilizable head on such low cost units would cost more than the unit itself and would be uneconomical. Additionally it would be difficult to provide 100% protection against transmissible diseases because such sealed laser therapy unit heads could not be made demountable in general use.

The present invention overcomes the defects of prior art laser therapy units by being fully sterilizable, low cost and easily attached in a firm manner to the head of said laser therapy units such that it will not become detached during the treatment period but can easily be removed after such a treatment period.

BACKGROUND OF THE INVENTION

The advent of the laser in 1960 heralded a new era in the ancient art of acupuncture treatment, which had previously been solely based on the use of needles to stimulate acupuncture points on human and animal bodies.

In 1966, one of us (John Leonarad Hughes) whilst working at the Defence Research Establishment in South Australia focused a three watts output of a blue-green argon ion laser onto his hand and experienced a needle-like sensation. Others used much lower powered lasers, in particular helium-neon lasers, emitting only a few milli-watts in the red, and claimed that acupuncture points could be stimulated at such low power levels without needle-like sensations.

Using acupuncture needles, the therapist inserts them into the patients through points reputed to affect the body in beneficial ways. When such needles are inserted into the patient's body, they can be mechanically vibrated to increase the claimed beneficial effects. Similarly, with laser beam stimulation of acupuncture points, the light beam can be modulated in intensity with claimed beneficial effects by laser therapists worldwide. As with acupuncture needles, treatments with laser beams can include pain relief, with the added advantage of deep wound treatments. However, the unique advantage of spot beam into a laser beam line which can then be spread into a rectangular or square distribution.

A further object of the invention is to increase the laser beam output power from laser therapy units such that their intensity remains within the international Class II limits of one milliwatt per circular area of 7 millimeters diameter which is equivalent to the estimated area of a fully dilated pupil of the human eye.

Yet a further object of the invention is to provide a sterilized, disposable attachment for therapy laser systems which allow for acupuncture point location via both galvanic and localized skin resistance measurements utilizing one and two electrode assemblies in the said disposable caps respectively.

BRIEF DESCRIPTION OF THE INVENTION

A better understanding of the invention may be obtained from the following consideration taken in conjunction with the figures which are not meant to limit the scope of the invention in any way.

FIG. 1 shows the cross-section of a moulded plastic half-section of a laser therapy system head with a compact helium-neon laser beam-generating tube mounted onto two cradles moulded into the said section. The position of the laser output beam is indicated as it passes through the tip of the moulded plastic handpiece formed by fitting together and gluing two of the moulded sections shown in FIG. 1.

FIG. 2 shows the cross-section of the moulded plastic head at 90 deg to that shown in FIG. 1. The moulded plastic head defines a conically-shaped output end.

FIG. 3 shows the form of the invention which provides a compact, hollow, conically-shaped sterilizable and disposable end cap without affecting the laser beam propagation direction.

FIG. 4 shows the form of the invention shown in FIG. 3 but with the skin resistance measurement electrodes installed.

FIG. 5 shows the output end portion of the system shown in FIG. 2 with the skin resistance electrodes installed.

FIG. 6 shows the configuration of the invention with a beam reflector/focusing assembly attached on a hollow extended stem.

FIG. 7 shows the configuration of FIG. 3 with a line forming extension which converts the cylindrically symmetrical laser output beam into a line beam of rectangular or square cross-section whose intensity per unit area satisfies International Class II safety standards but whose total power may exceed said standard in which case it is categorized International Class IIIA, the category of International Class IIIA corresponding to an expanded beam Class II output.

FIG. 8 shows a form of the invention for the 360 deg illumination of internal organs.

DETAILED DESCRIPTION OF THE INVENTION

In FIG. 1, numeral 1 indicates a moulded plastic half-section of a direct beam laser therapy unit head, numeral 2 indicates a laser tube, functioning as a laser beam generator numeral 3 the ballast resistors and numeral 4 the multicore, shielded electrical cable which connects said head assembly to the laser power supply at control unit. The laser output beam is indicated by numeral 5 as it propagates through the channel indicated by numeral 6 which is completed when the second half of the mould is attached to said bottom half 1. Numeral 7 indicates the locating groove for correctly orientating the invention onto the laser therapy head whilst the groove indicated by numeral 8 is the one used to firmly attach said invention onto said head. Numeral 9 indicates a groove to locate either an optically polished window or an optically polished laser beam attenuator which also acts as a stop for glass containers filled with various liquids which can be inserted in channel 6 and through which laser beam 5 can propagate. Numeral 10 indicates the recess for the safety switch necessary on Class II therapy lasers to block beam 5 as required. Numeral 11 indicates the moulded cradle which accepts the "O" ring mounting around the tube 2.

In FIG. 2, numeral 12 indicates the grooves in body 1 into which are positioned the springed conductors to complete the electrical circuits for the skin resistance electrodes used to locate the acupuncture points and activate the laser beam once they have been found. Numeral 13 indicates the location points used to firmly clip the top and bottom sections 1 together prior to gluing.

In FIG. 3, numeral 14 indicates the body of the invention which fits over the end cone of body 1 shown in the previous Figures. Numeral 15 indicates the circular rib which fits into groove 8 of the cone of body 1 shown in FIG. 1 so as to lock the invention into position during operation. Numeral 16 indicates the central tube of the invention which fits into channel 6 of FIG. 1, to such a depth as to keep the possibility of contamination to an absolute minimum. Numeral 17 indicates the two locating ribs to orient the invention, via grooves 7 of FIG. 1 onto the output head of body 1 of FIG. 1. Numeral 18 indicates the output aperture through which the laser beam emerges when the invention is attached to said laser therapy head.

In FIG. 4, numeral 19 indicates the electrodes used for the skin resistance measurements used for the location of acupuncture points. Numeral 20 indicates the tips of electrodes 19 which come into contact with the body of the patient. For galvanic skin resistance measurements only one of the said electrodes 19 is connected to the electrical circuits because the other contact is made via a hand-held electrode. However, for localized skin resistance measurements (LSR) both electrodes 19 are used with the skin between the two electrodes 20 forming part of the circuit.

In FIG. 5, numeral 21 indicates the spring connectors used to complete the skin resistance measurement circuit when the invention shown in FIG. 4 is attached to the laser therapy unit head 1.

In FIG. 6, numeral 22 indicates the hollow extension stem through which laser beam 5 propagates to the solid transparent head indicated by numeral 23. The laser beam 5 is then totally internally reflected via the flat surface indicated by numeral 24 onto the convex face indicated by numeral 25 via an external focus spot indicated by numeral 26 into the divergent beam indicated by numeral 27. As far as eye safety is concerned, focus point 26 will not be harmful to the eye for Class II safety lasers because the low power beam 5 expands into low intensity beam 27. Also low intensity beam 27 can be used to illuminate a larger area of the patient's body. On the other hand, fine focus point 26 is very useful for the treatment of delicate areas such as those on the ears or around the eyes where the standard laser beam output diameters are far too big for precision therapeutic treatments.

In FIG. 7, numeral 28 indicates a solid optical element through which laser beam 5 propagates after entering through the concave surface indicated by numeral 29 then expands via beam 30, to exit via the convex surface indicated by numeral 31 to become the output beam indicated by numeral 32 which can have a rectangular or square cross-section.

In FIG. 8, numeral 33 indicates a transparent plastic cap atop stem 22 through which beam 5 propagates, to be reflected into a 360 deg planar distribution indicated by numeral 34 via reflection off a conically cut segment indicated by numeral 35. The tip of the invention in this configuration is capped as indicated by numeral 36.

The invention has applications in conjunction with any laser therapy unit. The invention can be manufactured from a wide range of materials including both moulded plastics and metals such as stainless steel. The invention provides hygienic, disposable caps for laser therapy units operating both outside and within the human and animal bodies.

The claims defining the invention are as follows:

1. A hand-held, laser therapy, laser beam generating system consisting of two detachable sections, said system consisting of two detachable sections, said system consisting of:
   a main body containing the laser beam generator and terminated by a conically-shaped output end which has a bore extending along the long axis of said body, said bore having a diameter larger than the diameter of the laser beam generated so as to allow its direct, unhindered transmission out of said body which has a groove around the base of the said conical output tip positioned perpendicular to said axis, and
   a hollow, conically-shaped, sterilizable and disposable end cap which fits over the conically-shaped output tip of said main body, said cap being attached to said main body when a simple rib on the inside surface of said cap slips into the said groove in the said conical output tip of the main body, said cap having a hollow tube protruding inwards from its tip which slips into the said hole in the tip of the main body in such a manner that allows for the unhindered transmission of the laser output beam while giving added protection against the contamination of the laser beam transmission channel inside the tip of the said main body, said disposable cap then providing protection for both patient and therapists against diseases being transmitted via the invention.

2. A system as claimed in claim 1 where the laser beam intensity per unit area is less than 1 milliwatt per circular area of 7 mm diameter but whose total laser beam output power exceeds one milliwatt for laser wavelengths across the electromagnetic spectrum.

3. A system as claimed in claim 1, with two grooves cut along the surface of the bore inside the output end of the main body, with electrical conductors inserted into each of the said grooves in such a manner as to make contact with two matching electrical conductors inserted into the hollow inner tube of the disposable cap as said cap is attached to said output end of said body, the output ends of said electrical conductors being positioned on the outside cap so as to form a complete electrical circuit when both of said electrode ends come into contact with the skin of the patient undergoing therapeutic treatment, said electrical circuit then allowing for the measurement of localized skin resistance.

4. A system as claimed in claim 1, wherein the hollow tube protrudes outwards from the tip of the conical cap allowing the laser beam to be transmitted unhindered to its end which is terminated by a block of optically transparent material through which said laser beam propagates to be totally internally reflected off a surface of said block cut at an angle of 45° to the laser beam propagation path, so that said laser beam is reflected off said surface through an angle of 90° to emerge from a second surface off said terminating block which is of convex form allowing the emitted laser beam to be finely focused at a selectable distance from said output surface allowing for the therapeutic treatment demanding such a finely focused output beam such as around the patient's eyes, on their ears and inside their mouths, said disposable cap being molded as a single unit.

5. A system as claimed in claim 4 where the laser beam intensity per unit area is less than 1 milliwatt per circular area of 7 mm diameter but whose total laser beam output power exceeds one milliwatt for laser wavelengths across the electromagnetic spectrum.

6. A system as claimed in claim 1, wherein the hollow tube protrudes outwards from the tip of the hollow cap allowing the laser beam to be transmitted unhindered to its end which is terminated by a block of optically transparent material which acts as a solid laser beam expander to expand said laser output beam in diameter so as to maintain a safe intensity level over a much larger area of the patient's skin as is required for deep wound treatment and pain relief.

7. A system as claimed in claim 1, wherein the hollow tube protrudes outwards from the tip of the conical cap allowing the laser beam to be transmitted unhindered to its end which is terminated by a solid cone whose surface is mirrored to reflect said incident laser beam into a 360° plane of light at 90° to the original propagation path of said beam when the tip of said reflective cone is positioned in the center of said laser beam along its propagation path, said planar distribution of laser light being used to treat organs internal to the patient's body.

* * * * *